US010852256B2

(12) United States Patent
Voutilainen (10) Patent No.: US 10,852,256 B2
(45) Date of Patent: Dec. 1, 2020

(54) APPARATUS AND ASSOCIATED METHODS FOR COMPUTED TOMOGRAPHY (71) Applicant: Nokia Technologies Oy, Espoo (FI)

(72) Inventor: Martti Voutilainen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 247 days.

(21) Appl. No.: 15/769,235

(22) PCT Filed: Oct. 7, 2016

(86) PCT No.: PCT/FI2016/050698
§ 371 (c)(1),
(2) Date: Apr. 18, 2018

(87) PCT Pub. No.: WO2017/072398
PCT Pub. Date: May 4, 2017

(65) Prior Publication Data
US 2018/0299390 A1 Oct. 18, 2018

(30) Foreign Application Priority Data
Oct. 28, 2015 (EP) ..................................... 15191855

(51) Int. Cl.
*G01N 23/046* (2018.01)
*G01T 1/29* (2006.01)
*G01T 1/36* (2006.01)

(52) U.S. Cl.
CPC ......... *G01N 23/046* (2013.01); *G01T 1/2985* (2013.01); *G01T 1/362* (2013.01)

(58) Field of Classification Search
CPC ....... G01N 2223/33; G01N 2223/3303; G01N 2223/505; G01N 23/046; H01L 27/14;
(Continued)

(56) References Cited

U.S. PATENT DOCUMENTS 6,324,249 B1 11/2001 Fazzio
6,459,755 B1 10/2002 Li
(Continued)

FOREIGN PATENT DOCUMENTS

EP 3174108 A1 * 5/2017 ..... H01L 31/035218
GB 1525463 A 9/1978
(Continued)

OTHER PUBLICATIONS

Office Action received for corresponding European Patent Application No. 15191855.4, dated Jun. 5, 2019, 4 pages.
(Continued)

*Primary Examiner* — Anastasia Midkiff
(74) *Attorney, Agent, or Firm* — Harrington & Smith (57) ABSTRACT

An apparatus, method and computer program for operating an apparatus. The apparatus comprises: a scintillator and an array of photodetectors; the scintillator configured to be rotatable around the periphery of a computed tomography scanner, the scintillator configured to receive X-rays incident on the scintillator, convert the received X-rays to visible light and transmit the visible light towards a corresponding photodetector of the array of photodetectors; and the array of photodetectors fixed around the periphery of the computed tomography scanner, each of the photodetectors in the array of photodetectors configured to output an electrical signal in response to detecting the visible light received from the scintillator.

20 Claims, 5 Drawing Sheets

(58) Field of Classification Search
CPC . H01L 27/142; H01L 27/144; H01L 27/1446; H01L 27/146; H01L 27/14601; H01L 27/14603; H01L 27/14609; H01L 27/14612; H01L 27/14616; H01L 27/1462; H01L 27/14623; H01L 27/14625; H01L 27/14661; H01L 27/14663; H01L 27/14665; H01L 27/14676; H01L 27/148; H01L 27/14806; H01L 27/14812; H01L 27/14893; G01T 1/166; G01T 1/20; G01T 1/2006; G01T 1/2957; G01T 1/2964; G01T 1/2985; A61B 6/02; A61B 6/03; A61B 6/032; A61B 6/035; A61B 6/42; A61B 6/4208; A61B 6/4266; A61B 6/4275; A61B 6/44; A61B 6/4429; A61B 6/4435; A61B 2560/04; A61B 2562/16; A61B 2562/18
See application file for complete search history.

(56) References Cited

U.S. PATENT DOCUMENTS

| | | | |
|---|---|---|---|
| 6,717,150 B2 | 4/2004 | Hoffman | |
| 6,907,101 B2 | 6/2005 | Hoffman | |
| 7,460,637 B2 | 12/2008 | Clinthorne et al. | |
| 8,406,037 B2 * | 3/2013 | Voutilainen | G11C 13/0002 365/149 |
| 8,441,090 B2 * | 5/2013 | Tian | H01L 27/14603 257/444 |
| 8,492,728 B2 | 7/2013 | Antonuk | |
| 9,024,300 B2 * | 5/2015 | Voutilainen | B32B 3/10 257/40 |
| 2011/0176662 A1 | 7/2011 | Watanabe et al. | |
| 2011/0278541 A1 * | 11/2011 | Huang | H01L 31/02327 257/21 |
| 2012/0001761 A1 | 1/2012 | Voutilainen et al. | |
| 2013/0032782 A1 * | 2/2013 | Gerasimos | B82Y 10/00 257/21 |
| 2014/0264275 A1 * | 9/2014 | Zhong | H01L 31/028 257/21 |
| 2014/0299741 A1 * | 10/2014 | Colli | H01L 31/03521 250/200 |
| 2016/0005894 A1 * | 1/2016 | Zhang | B82Y 40/00 257/29 |
| 2016/0209514 A1 * | 7/2016 | Moskal | G01T 1/1603 |

FOREIGN PATENT DOCUMENTS

| | | |
|---|---|---|
| GB | 2072452 A | 9/1981 |
| WO | 2011/030240 A2 | 3/2011 |
| WO | 2011/108555 A1 | 9/2011 |
| WO | WO-2013021095 A2 * | 2/2013 ........... G01L 1/2293 |

OTHER PUBLICATIONS

Zyazin et al., "Complete Optical Stack Modeling for CMOS-Based Medical X-Ray Detectors", Proceedings of the SPIE, Medical Imaging 2015: Physics of Medical Imaging, vol. 9412, Mar. 18, 2015, 9 pages.
Scampini, "Introduction to Computed Tomography (CT) Medical Imaging", Maxim Integrated, May 10, 2010, pp. 1-5.
Takahashi et al., "Carbon Nanotube Active-matrix Backplanes for Mechanically Flexible Visible Light and X-Ray Imagers", Nano Letters, vol. 13, No. 11, Oct. 21, 2013, pp. 5425-5430.
Extended European Search Report received for corresponding European Patent Application No. 15191855.4, dated Apr. 26, 2016, 9 pages.
Konstantatos et al., "Hybrid Graphene-Quantum Dot Phototransistors with Ultrahigh Gain", Nature Nanotechnology, vol. 7, Jun. 2012, pp. 363-368.
International Search Report and Written Opinion received for corresponding Patent Cooperation Treaty Application No. PCT/FI2016/050698, dated Jan. 12, 2017, 13 pages.

* cited by examiner

APPARATUS AND ASSOCIATED METHODS FOR COMPUTED TOMOGRAPHY

RELATED APPLICATION

This application was originally filed as PCT Application No. PCT/FI2016/050698 filed Oct. 7, 2016 which claims priority benefit from EP Patent Application No. 15191855.4 filed Oct. 28, 2015.

TECHNICAL FIELD

The present disclosure relates to the field of computed tomography (CT), in particular detector arrangements suitable for use in a computed tomography (CT) system.

BACKGROUND

The present disclosure relates to the computed tomography (CT), also known as X-ray computed tomography (X-ray CT) or computerized axial tomography (CAT).

The listing or discussion of a prior-published document or any background in this specification should not necessarily be taken as an acknowledgement that the document or background is part of the state of the art or is common general knowledge.

SUMMARY

According to a first aspect, there is provided an apparatus comprising a scintillator and an array of photodetectors;
the scintillator configured to be rotatable around the periphery of a computed tomography scanner, the scintillator configured to receive X-rays incident on the scintillator, convert the received X-rays to visible light and transmit the visible light towards a corresponding photodetector of the array of photodetectors; and
the array of photodetectors fixed around the periphery of the computed tomography scanner, each of the photodetectors in the array of photodetectors configured to output an electrical signal in response to detecting the visible light received from the scintillator.

One or more of the photodetectors in the array of photodetectors may comprise:
a two dimensional conductive channel with source and drain electrodes configured to enable a flow of electrical current through the two dimensional conductive channel; and
a quantum dot layer overlying the two dimensional conductive channel, the quantum dot layer configured to generate charge on exposure to incident light, the generated charge producing an electric field which causes a change in electrical current passing through the underlying two dimensional conductive channel, the change in electrical current indicative of one or more of the presence and magnitude of the incident light.

The two dimensional conductive channel of one or more of the photodetectors may comprise graphene.

The scintillator may comprises an X-ray incident surface configured to receive incident X-rays and a light transmission surface opposite the X-ray incident surface, the light transmission surface configured to transmit the visible light converted by the scintillator from X-rays received by the scintillator towards the corresponding photodetector, and each of the corresponding photodetectors may comprise a light incident surface configured to receive the visible light transmitted from the light transmission surface of the scintillator.

The apparatus may further comprises an optical element between the scintillator and the corresponding photodetector, the optical element configured to direct visible light from the scintillator substantially normally onto the corresponding photodetector.

The optical element may comprise one or more of: an optical lens, a fibre optic bundle, and a collimator.

The apparatus may further comprise at least one anti-reflection layer between the scintillator and the corresponding photodetector, the at least one anti-reflection layer configured to facilitate the passage of visible light from the scintillator to the corresponding photodetector.

The at least one anti-reflection layer may comprise one or more of:
a scintillator anti-reflection layer located at a light transmission surface of the scintillator, the light transmission surface configured to transmit the visible light converted by the scintillator to the corresponding photodetector; and
a photodetector anti-reflection layer located at a light incident surface of the corresponding photodetector, the light incident surface configured to receive visible light transmitted from the scintillator.

The apparatus may further comprise an air gap between the scintillator and the corresponding photodetector, the air gap configured to allow for reducing the likelihood of damage to one or more of the scintillator and array of photodetectors caused by thermal expansion of one or more of the scintillator and the array of photodetectors.

The scintillator may comprise an X-ray incident surface configured to receive incident X-rays, and the apparatus may further comprise a low energy X-ray absorbing layer at the X-ray incident surface configured to prevent the passage of low energy X-rays to the scintillator.

The apparatus may further comprise an ambient light shield configured to prevent the passage of light to the corresponding photodetector other than visible light produced by the scintillator by the conversion of X-rays.

The scintillator may be mounted on a support configured to be rotatable around the periphery of a computed tomography scanner; and the support may be configured to allow for an X-ray source to be mounted opposite the scintillator on the support.

The apparatus may further comprise the X-ray source mounted opposite the scintillator on the support, the X-ray source and the scintillator configured to be rotatable together, the X-ray source configured to produce X-rays for conversion to visible light by the scintillator.

According to a further aspect, there is provided a method comprising:
receiving, using a scintillator configured to be rotatable around the periphery of a computed tomography scanner, X-rays incident on the scintillator;
converting, using the scintillator, the received X-rays to visible light for transmission;
transmitting, using the scintillator, the visible light for detection;
detecting the transmitted visible light at a corresponding photodetector of an array of photodetectors fixed around the periphery of the computed tomography scanner, each of the photodetectors in the array of photodetectors configured to output an electrical signal in response to detecting the visible light received from the scintillator.

The steps of any method described herein may be performed in any order to as to carry out the inventive function as understood by the skilled person.

Corresponding computer programs (which may or may not be recorded on a carrier) for implementing one or more of the methods disclosed herein are also within the present disclosure and encompassed by one or more of the described example embodiments.

According to a further aspect, there is provided a computer readable medium comprising computer program code stored thereon, the computer readable medium and computer program code being configured to, when run on at least one processor, control the operation of an apparatus, the apparatus comprising:

a scintillator and an array of photodetectors;

the scintillator configured to be rotatable around the periphery of a computed tomography scanner, the scintillator configured to receive X-rays incident on the scintillator, convert the received X-rays to visible light and transmit the visible light towards a corresponding photodetector of the array of photodetectors; and the array of photodetectors fixed around the periphery of the computed tomography scanner, each of the photodetectors in the array of photodetectors configured to output an electrical signal in response to detecting the visible light received from the scintillator;

the control providing for one or more of:

reception by the scintillator of X-rays incident on the scintillator;

conversion, by the scintillator, of the received X-rays to visible light for transmission;

transmission, by the scintillator, of the visible light for detection; and detection of the transmitted visible light at a corresponding photodetector.

According to a further aspect, there is provided an apparatus comprising scintillation means and photodetection means;

the scintillation means configured to be rotatable around the periphery of a computed tomography scanner, the scintillation means configured to receive X-rays incident on the scintillation means, convert the received X-rays to visible light and transmit the visible light towards a corresponding region of the photodetection means; and the photodetection means fixed around the periphery of the computed tomography scanner, each of the regions of the photodetection means configured to output an electrical signal in response to detecting the visible light received from the scintillation means.

The present disclosure includes one or more corresponding aspects, example embodiments or features in isolation or in various combinations whether or not specifically stated (including claimed) in that combination or in isolation. Corresponding means and functional units for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:—

DESCRIPTION OF SPECIFIC ASPECTS/EMBODIMENTS

Computed tomography (CT) uses irradiation, usually with X-rays, to obtain a three-dimensional representation of a scanned object. Industrial CT scanning can be used for internal inspection of components without disassembly of the components. Medical CT scans may be used to obtain images of the inside of the human/animal body being scanned.

Usually X-rays are transmitted to and through a body to be imaged. The transmitted X-rays are then incident on a scintillator which converts X-ray electromagnetic radiation to visible light electromagnetic radiation. The visible light is then detected by a photodetector which converts the received light to an electrical signal for processing. Usually this takes place in a cylindrical geometry scanner so that the X-ray source can rotate around the body to be imaged, taking many X-ray images from different angles. The different images are combined to produce a cross-sectional (tomographic) image of the imaged body.

Figure 3A:
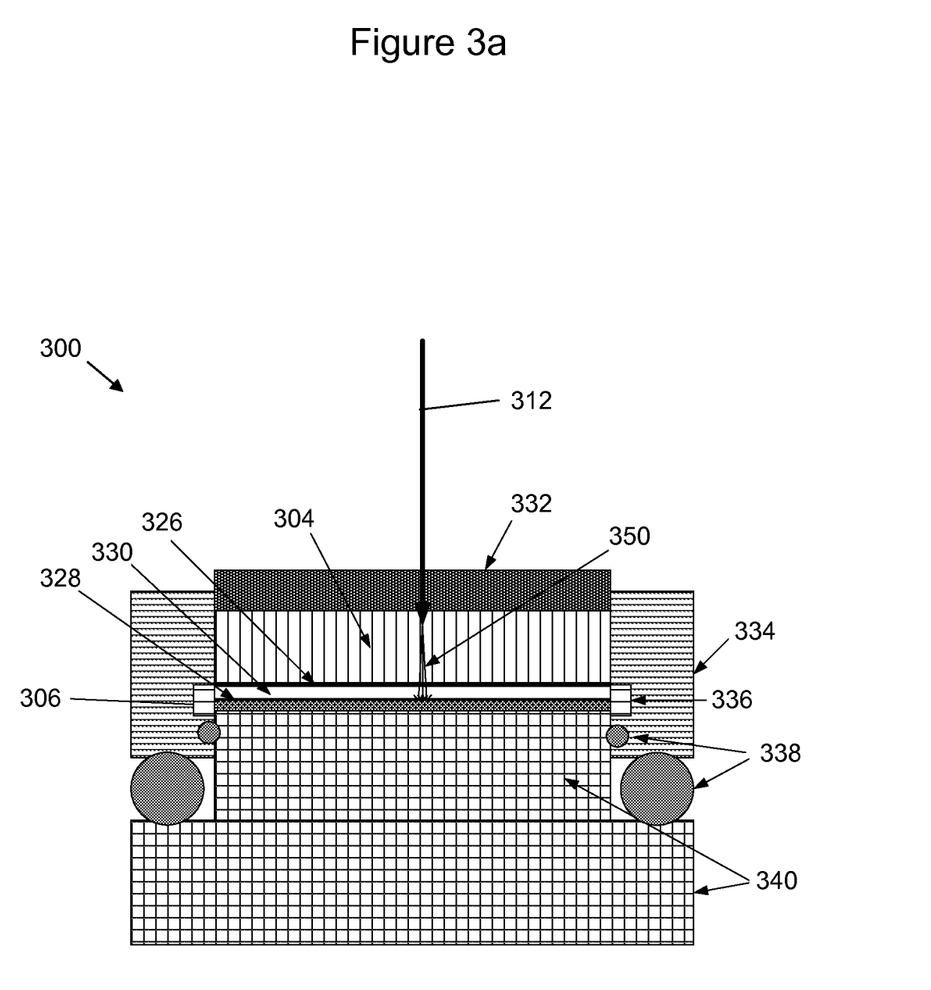
FIGS. 3a and 3b illustrate an apparatus according to examples described herein.
Figure 3B:
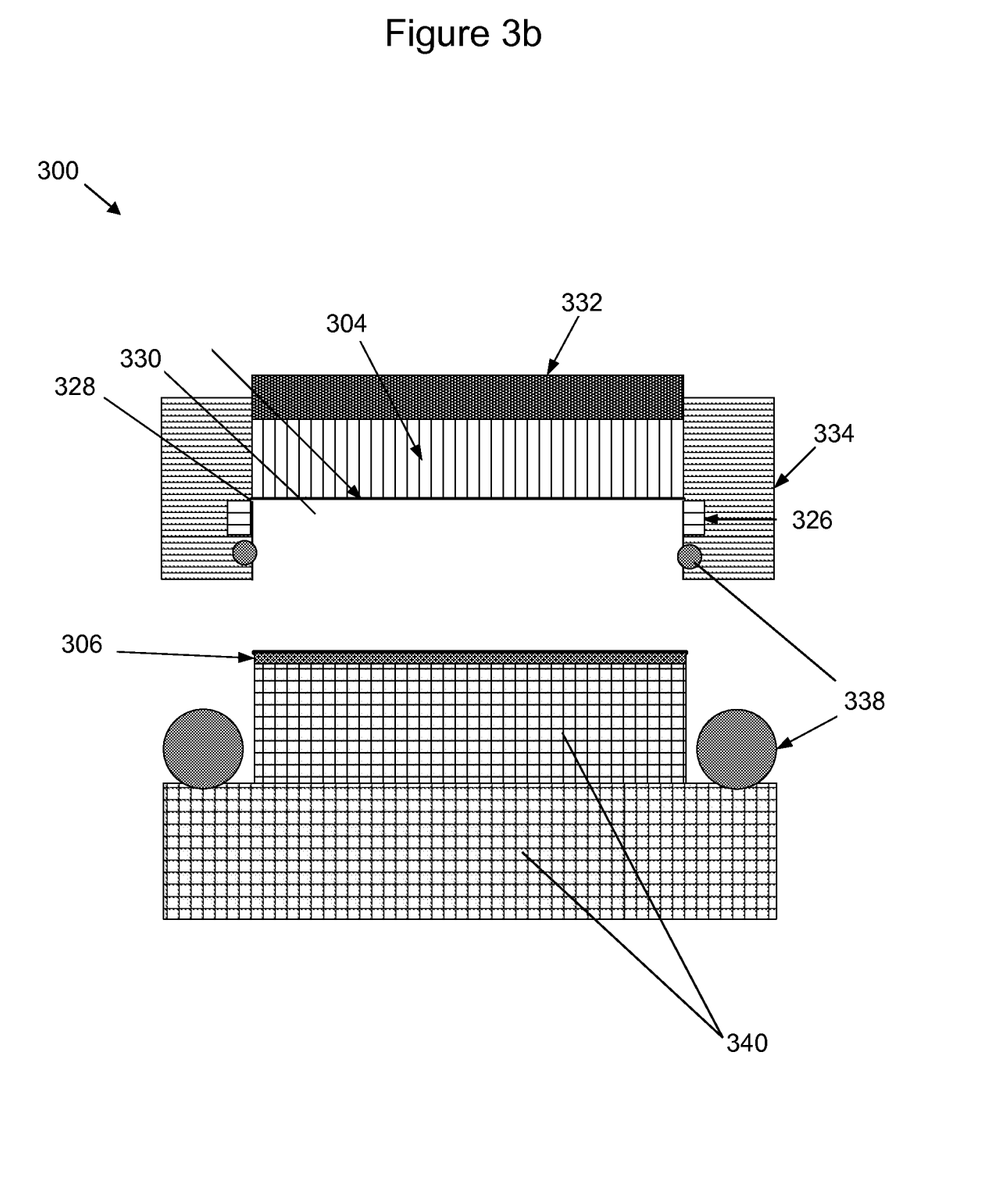

Photodetectors based on quantum dot functionalised field effect transistors (QD-FETs), may be used for photodetection in a CT scanner. Such photodetectors generally comprise a two dimensional conductive channel, such as a graphene channel, with source and drain electrodes configured to enable a flow of electrical current through the two dimensional conductive channel. A photodetector with a graphene two dimensional conducting channel may be called a graphene FET (or GFET). A quantum dot layer overlying the two dimensional conductive channel may be configured to generate charge on exposure to incident light. The generated charge produces an electric field which causes a change in electrical current passing through the underlying two dimensional conductive channel. The change in electrical current is indicative of one or more of the presence and magnitude of the incident light. That is, the quantum dots use received light to gate the channel of the FET. Such photodetectors are described in more detail with reference to FIG. 3. Such photodetectors may be very sensitive, possibly being able to detect a single photon. Thus a relatively low X-ray dose, converted to visible light, can be detected and converted by the photodetector to give a relatively large electrical signal, thereby allowing for very sensitive measurements to be made.

Using such detectors in a CT scanner may be advantageous because they can provide high light sensitivity and are relatively cheap and easy to produce even in large numbers (i.e. covering a large photodetection area). However, such detectors may provide a slow response to light intensity changes, especially with very low light intensities below 1 mW/m$^2$, due to the quantum dot processes taking place.

Therefore, it may be possible to use such detectors as photodetectors in a CT system where around 10 ms-100 ms are allowed between subsequent signal read out and reset after light exposure due to detection of visible light converted from transmitted X-rays. As a consequence, to use such detectors, the detectors should cover at least as large an area as is illuminated by photons generated from X-ray flux in 100 ms (the nominal current upper limit of photodetector reset time), so that the area of photodetector used to detect indecent visible light can be restored/reset to accept a subsequent light exposure generated by X-rays.

Figure 1A:
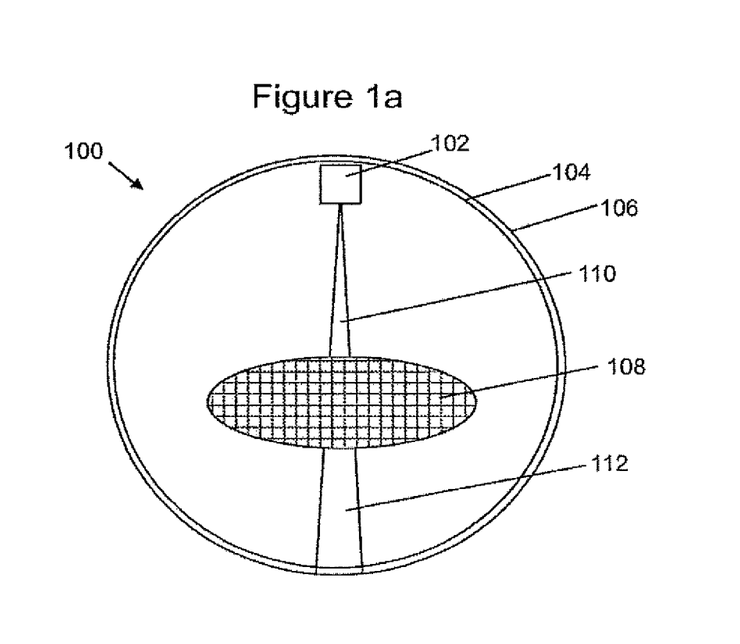
FIG. 1a illustrates a CT scanner having both photodetectors and scintillators around the periphery of the scanner.

FIG. 1a shows an example of a CT scanner in which an array of photodetectors 106 (e.g. pixels) are fixed around the periphery of the CT scanner 100. An X-ray source 102 is shown transmitting X-rays 110 to a body 108 for imaging. Transmitted X-rays 112 containing information about the body 108 which they passed through are incident on the region of the CT scanner inside surface opposite the X-ray source 102. Photodetectors 106 are located around the inside periphery of the CT scanner as discussed above to detect light converted from transmitted X-rays. In order to convert the transmitted X-rays 112 to visible light for detection by the photodetector layer 106, a scintillator 104 is used which converts X-rays to visible light. In this example, because the photodetectors 106 are located around the inside periphery of the CT scanner 100, scintillators 104 are also located around the inside periphery of the CT scanner 100 between the transmitted X-rays 112 and the photodetectors 106. The X-ray source 102 is configured to rotate around the body 108 to take X-ray images at different angles to build up a tomographic image of the inside of the body. Therefore, due to the inside periphery of the CT scanner 100 having a scintillator 104 plus photodetector layer 106, transmitted X-rays 112 may be detected as the X-ray source 104 moves around the body 108.

A disadvantage to this method is that scintillators are expensive and therefore the system shown in FIG. 1a which requires scintillators around the whole periphery of the CT scanner may not be a particularly cost effective one.

Figure 1B:
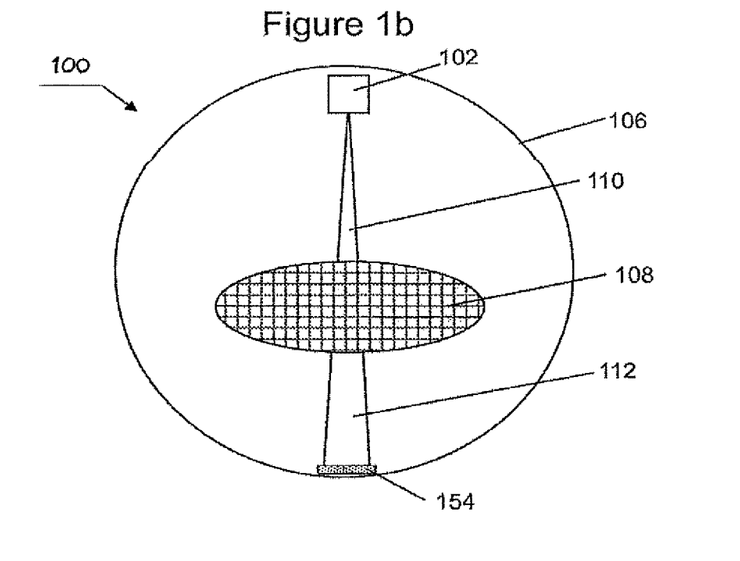
FIG. 1b illustrates a CT scanner having photodetectors around the periphery of the scanner and a rotatable scintillator according the examples disclosed herein.

The problem of requiring scintillators 104 around the periphery of the CT scanner 100 when using photodetectors 106 which are mounted around the periphery of the CT scanner 100 may be solved using an arrangement as shown in FIG. 1b. In this example the scintillator 154 has been separated from the photodetectors 106. The scintillator 154 can rotate with the X-ray source 102. In this way a very small area scintillator 154 is needed to be able to convert X-rays 112 to visible light for detection by the entire photodetector array 106 around the inside of the CT scanner 100. The scintillator 154 size should be as large as the area where the transmitted X-ray beam 112 hits. In some examples a small X-ray incident area (thus a small scintillator size) may be 1×16 pixels wide, with typical CT pixel dimensions of approximately 0.625 mm×10 mm. Using a more traditional implementation shown in FIG. 1a, where the scintillator 104 does not move relative to the photodetector 106 and in which the whole photodetection area 106 is around the inside periphery of the CT scanner 100, the scintillator 104 would need to be approximately 3 m×10 mm in size, approximately 4800 times larger.

Therefore the apparatus of FIG. 1b may be considered to comprise a scintillator 154 and an array of photodetectors 106. The scintillator 154 is configured to be rotatable around the periphery of a computed tomography scanner 100, the scintillator 154 configured to receive X-rays 112 incident on the scintillator 154, convert the received X-rays 112 to visible light and transmit the visible light towards a corresponding photodetector of the array of photodetectors 106; and the array of photodetectors 106 fixed around the periphery of the computed tomography scanner 100, each of the photodetectors in the array of photodetectors 106 configured to output an electrical signal in response to detecting the visible light received from the scintillator 154.

The scintillator 154 may be mounted on a support configured to be rotatable around the periphery of the computed tomography scanner 100. The support may be configured to allow for an X-ray source 102 to be mounted opposite the scintillator 154 on the support. In some examples the apparatus 100 may further comprise the X-ray source 102 mounted opposite the scintillator 154 on the support (not shown). The X-ray source 102 and the scintillator 154 would then be configured to be rotatable together. In any case, the X-ray source is configured to produce X-rays for conversion to visible light by the scintillator. In this way the X-ray source 102 and scintillator 154 may be movable together, thereby maintaining a known alignment and allowing for easier processing of the resultant detected visible light signals. The mount should be sufficient mechanically rigid to ensure a well-known orientation/location of the scintillator with respect to the X-ray source; this is achievable since visible light (around 550 nm wavelength) is readily controllable (for example, using lenses/collimators etc.) allowing for a manageable tolerance in error in orientation/location of the scintillator with respect to the X-ray source.

Figure 2:
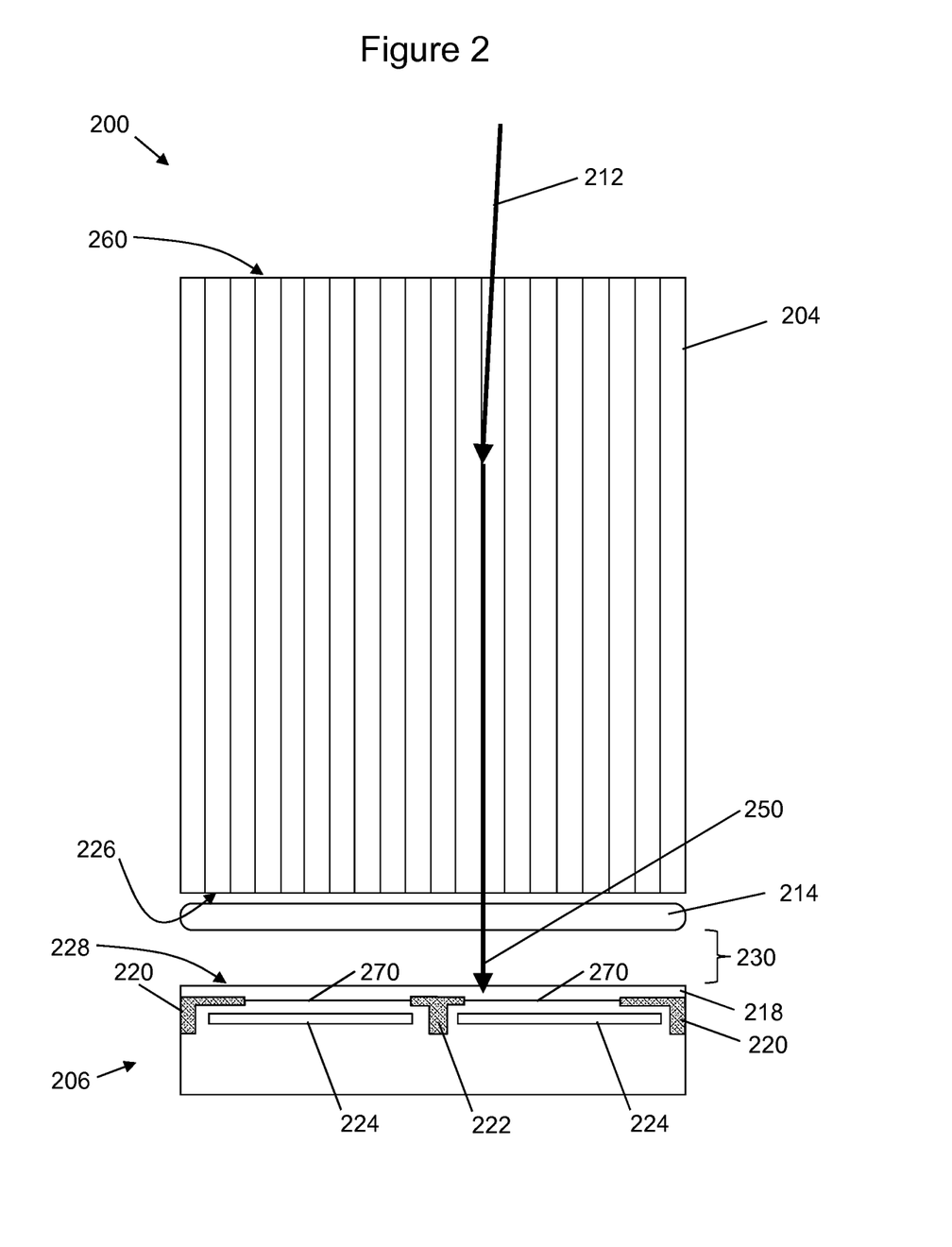
FIG. 2 illustrates schematically an apparatus according to examples described herein.

FIG. 2 illustrates an apparatus 200 according to examples disclosed herein. The apparatus 200 comprises a scintillator 204 and an array of photodetectors (one such photodetector 206 is shown which is part of an array of such photodetectors which are fixed around the periphery of a computed tomography scanner.) The photodetector 206 in the array of photodetectors is configured to output an electrical signal in response to detecting the visible light 250 received from the scintillator 204. The scintillator 204 is configured to be rotatable around the periphery of the computed tomography scanner and is configured to receive X-rays 212 incident on the scintillator, convert the received X-rays to visible light 250 and transmit the visible light 250 towards the corresponding photodetector 206.

The scintillator 204 comprises an X-ray incident surface 260 configured to receive incident X-rays 212 and a light transmission surface 226 opposite the X-ray incident surface 260. The light transmission surface 226 is configured to transmit the visible light 250 converted by the scintillator 204 from X-rays 212 received by the scintillator 204 towards the corresponding photodetector 206. Each of the corresponding photodetectors 206 comprise a light incident surface 228 configured to receive the visible light 250 transmitted from the light transmission surface 226 of the scintillator 204. The scintillator 204 may comprise a series of parallel fibres extending between the X-ray incident surface 260 configured to receive incident X-rays 212 and a light transmission surface 226 configured to produce visible light photons substantially normally to the a light transmission surface 226 (and therefore substantially normally to the light incident surface 228 of the photodetector 206).

In this example the visible light 250, after exiting the light transmission surface 226 the scintillator 204, travels "indirectly" to the photodetector 206; that is, the visible light 250 is transmitted through one or more media before reaching the light incident surface 228 of the photodetector 206. In this example, an air gap 230 is located between the scintillator 204 and the corresponding photodetector 206 (specifically between the light transmission surface 226 of the scintillator 204 and the light incident surface 228 of the photodetector 206). The air gap 230 is configured to allow for reducing the likelihood of damage to one or more of the scintillator 204 and array of photodetectors (of which the photodetector 206 is a part) caused by thermal expansion of one or more of the scintillator 204 and the array of photodetectors 206.

The apparatus 200 in this example further comprises an optical element 214 located between the scintillator 204 and the corresponding photodetector 206. This optical element 214 is configured to direct visible light 250 from the scintillator 204 substantially normally onto the corresponding photodetector 206 (more particularly, direct visible light 250 from the light transmission surface 226 of the scintillator 204 to be substantially normally incident on the light incident surface 228 of the photodetector 206). The optical element 214 may comprise, for example, an optical lens, a fibre optic bundle/fibre optic plate, a collimator, or a combination of these. The optical element 214 may allow for the visible light from the scintillator 204 to impinge normally onto the photodetector 206 light incident surface. The light incident surface may also be called the light receiving surface (since it receives the visible light), or the light detection surface (since any light detected will impinge upon this surface of the photodetector).

The apparatus 200 further comprises at least one anti-reflection layer between the scintillator 204 and the corresponding photodetector 206. The at least one anti-reflection layer is configured to facilitate the passage of visible light 250 from the scintillator 204 to the corresponding photodetector 206 (that is, the anti-reflection coating(s) are configured to enable an increased efficiency of light transfer compared with the apparatus without the coating(s)). In this example, one scintillator anti-reflection coating is located at the light transmission surface 226 of the scintillator 204, and another photodetector anti-reflection layer is located at the light incident surface 228 of the corresponding photodetector 204.

The photodetector 206 may be based on a FET structure, comprising a two dimensional conductive channel 270 with source and drain electrodes 220, 222 configured to enable a flow of electrical current through the two dimensional conductive channel 270. The two dimensional conductive channel 270 may be graphene. The photodetector 206 also comprises a quantum dot layer 218 overlying the two dimensional conductive channel 270, the quantum dot layer 218 configured to generate charge on exposure to incident light, the generated charge producing an electric field which causes a change in electrical current passing through the underlying two dimensional conductive channel 270, the change in electrical current indicative of one or more of the presence and magnitude of the incident light 250. In this example, embedded/buried back gates 224 are also present in the photodetector 206. While the quantum dot layer 218 is configured to "gate" the FET device/photodetector 206, a buried gate 224 may additionally be used to modulate the charge carrier properties of the two dimensional conductive channel 270 and control the operation of the photodetector.

Of course in other examples the array of photodetectors may be any type or types of photodetector suitable for fixing around the periphery of a CT scanner.

FIGS. 3a and 3b illustrate an apparatus 300 according to examples disclosed herein. The apparatus is shown in FIG. 3a with the scintillator portion and the photodetector portion together as they would be during operation. FIG. 3b shows the apparatus 300 separated into the scintillator portion and the photodetector portion to help understand the component parts of the rotatable scintillator portion and the fixed photodetector portion.

In FIGS. 3a and 3b, the scintillator 304 is shown with one photodetector 306 of an array of such photodetectors. The scintillator 304 is configured to be rotatable around the periphery of a computed tomography scanner by being fixed to a rotating ring mount 334 on which is also mounted the X-ray source (not shown) of the CT scanner. In this way the scintillator 304 and the X-ray source have a fixed relationship with respect to one another, helping downstream signal processing by the relation between the scintillator 304 and the X-ray source being known. The scintillator 304 is configured to be rotatable because its rotating ring mount 334 is mounted on ball bearings 338 allowing rotation with respect to the photodetector 306 which is fixed to a fixed mount 340. Of course, the skilled person will appreciate any suitable scintillator 304 mounting means 334, 340 may be used, not only a ring mount 334 supported on ball bearings 338.

As discussed in relation to FIG. 2, the apparatus 300 of FIGS. 3a and 3b also comprises an air gap 330 between the scintillator 304 and the corresponding photodetector 306, and antireflection layers/coatings 326, 328 located respectively at the light transmission surface of the scintillator 304 and the light incident surface of the corresponding photodetector 304. There may in some examples also be an optical element, such as a lens, located at the light transmission surface of the scintillator, to direct visible light normally onto the light incident surface of the photodetector 306.

The apparatus 300 of FIGS. 3a and 3b further comprises an ambient light shield 336 configured to prevent the passage of light to the corresponding photodetector 306 other than visible light 350 produced by the scintillator 304 by the conversion of X-rays 312. It is important to ensure that ambient light is prevented from impinging on the photodetector light incident surface. By using a rigid mechanical support 340 as described for the scintillator 304, along with ambient light shielding 336 for the photodetector 306, this is achievable.

The scintillator 304 may be described as comprising an X-ray incident surface configured to receive incident X-rays 312. At this X-ray incident surface in this example, the apparatus 300 further comprises a low energy X-ray absorbing layer 332 at the X-ray incident surface configured to prevent the passage of low energy X-rays to the scintillator 304.

Figure 4:
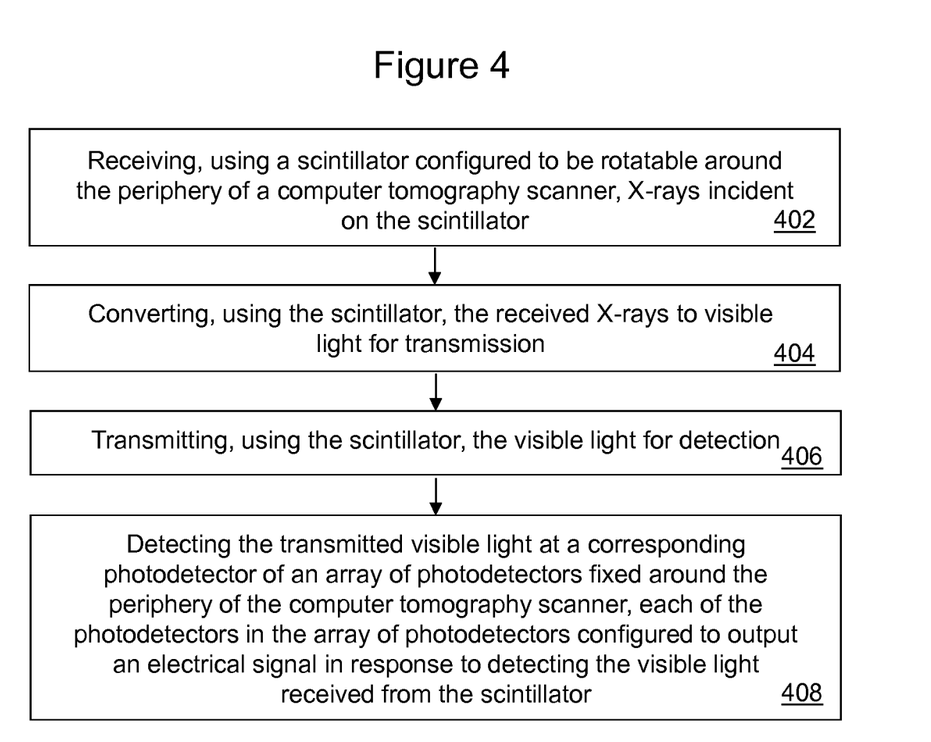
FIG. 4 illustrates a method according to examples described herein.

FIG. 4 shows the main steps 402, 404, 406, 408 of a method of making the present apparatus. The method comprises receiving, using a scintillator configured to be rotatable around the periphery of a computed tomography scanner, X-rays incident on the scintillator 402, converting, using the scintillator, the received X-rays to visible light for transmission 404;transmitting, using the scintillator, the visible light for detection 406; and detecting the transmitted visible light at a corresponding photodetector of an array of photodetectors fixed around the periphery of the computed tomography scanner, each of the photodetectors in the array of photodetectors configured to output an electrical signal in response to detecting the visible light received from the scintillator 408.

Figure 5:
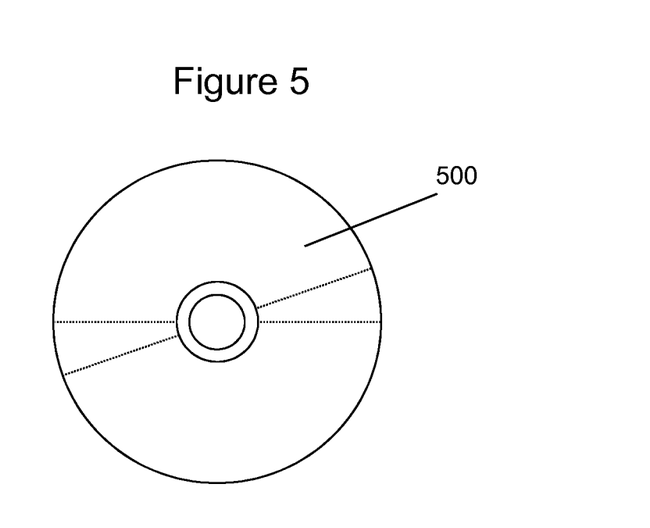
FIG. 5 shows a computer-readable medium comprising a computer program configured to control an apparatus as described herein according to the method of FIG. 4.

FIG. 5 illustrates schematically a computer/processor readable medium 500 providing a computer program according to one embodiment. The computer program comprises computer code configured to control an apparatus as shown in FIGS. 1b, 2, 3a and 3b above, which comprises a scintillator and an array of photodetectors; the scintillator configured to be rotatable around the periphery of a computed tomography scanner, the scintillator configured to receive X-rays incident on the scintillator, convert the received X-rays to visible light and transmit the visible light towards a corresponding photodetector of the array of photodetectors; and the array of photodetectors fixed around the periphery of the computed tomography scanner, each of the photodetectors in the array of photodetectors configured to output an electrical signal in response to detecting the visible light received from the scintillator. The control performed by the computer program comprises one or more of: reception by the scintillator of X-rays incident on the scintillator; conversion, by the scintillator, of the received X-rays to visible light for transmission; transmission, by the scintillator, of the visible light for detection; and detection of the transmitted visible light at a corresponding photodetector.

It will be appreciated that in certain examples there will be a mechanism in place by which the position of the scintillator, with respect to one or more particular photodetectors in the array of photodetectors, at a particular time can be determined. This position information may be used, for example, to activate (i.e. read the output from) one or more photodetectors within a particular predetermined distance from the scintillator position. Accordingly, readout can be synchronized so that the (e.g. QD-GFET) photodetectors are powered just before or shortly after X-ray exposure (equivalent to the time when the scintillator is above that photodetector area), and then powered down afterwards. Furthermore, read-out from the photodetectors can start at an appropriate time which may be shortly after X-ray exposure e.g. after a time period that depends on charge transit time from QDs to the graphene channel (being about 10-20 ms typically).

In this example, the computer/processor readable medium 500 is a disc such as a digital versatile disc (DVD) or a compact disc (CD). In other embodiments, the computer/processor readable medium 500 may be any medium that has been programmed in such a way as to carry out an inventive function. The computer/processor readable medium 900 may be a removable memory device such as a memory stick or memory card (SD, mini SD, micro SD or nano SD).

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
a scintillator and an array of photodetectors;
the scintillator configured to be rotatable around an inner periphery of a computed tomography scanner, the scintillator configured to receive X-rays incident on the scintillator, convert the received X-rays to visible light and transmit the visible light towards a corresponding photodetector of the array of photodetectors; and
the array of photodetectors fixed around the inner periphery of the computed tomography scanner between the scintillator and the inner periphery, each of the photodetectors in the array of photodetectors configured to output an electrical signal in response to detecting the visible light received from the scintillator.

2. The apparatus of claim 1, wherein one or more of the photodetectors in the array of photodetectors comprise:
a two dimensional conductive channel with source and drain electrodes configured to enable a flow of electrical current through the two dimensional conductive channel; and
a quantum dot layer overlying the two dimensional conductive channel, the quantum dot layer configured to generate charge on exposure to incident light, the generated charge producing an electric field which causes a change in electrical current passing through the underlying two dimensional conductive channel, the change in electrical current indicative of one or more of the presence and magnitude of the incident light.

3. The apparatus of claim 2, wherein the two dimensional conductive channel comprises graphene.

4. The apparatus of claim 1, wherein:
the scintillator comprises an X-ray incident surface configured to receive incident X-rays and a light transmission surface opposite the X-ray incident surface, the light transmission surface configured to transmit the visible light converted by the scintillator from X-rays received by the scintillator towards the corresponding photodetector, and
each of the corresponding photodetectors comprises a light incident surface configured to receive the visible light transmitted from the light transmission surface of the scintillator.

5. The apparatus of claim 1, wherein the apparatus further comprises an optical element between the scintillator and the corresponding photodetector, the optical element configured to direct visible light from the scintillator substantially normally onto the corresponding photodetector.

6. The apparatus of claim 1, wherein the apparatus further comprises at least one anti-reflection layer between the scintillator and the corresponding photodetector, the at least one anti-reflection layer configured to facilitate the passage of visible light from the scintillator to the corresponding photodetector.

7. The apparatus of claim 6, wherein the at least one anti-reflection layer comprises one or more of:
a scintillator anti-reflection layer located at a light transmission surface of the scintillator, the light transmission surface configured to transmit the visible light converted by the scintillator to the corresponding photodetector; and
a photodetector anti-reflection layer located at a light incident surface of the corresponding photodetector, the light incident surface configured to receive visible light transmitted from the scintillator.

8. The apparatus of claim 1, wherein the apparatus further comprises an air gap between the scintillator and the corresponding photodetector, the air gap configured to allow for reducing the likelihood of damage to one or more of the scintillator and array of photodetectors caused by thermal expansion of one or more of the scintillator and the array of photodetectors.

9. The apparatus of claim 1, wherein the scintillator comprises an X-ray incident surface configured to receive incident X-rays, the apparatus further comprising a low energy X-ray absorbing layer at the X-ray incident surface configured to prevent the passage of low energy X-rays to the scintillator.

10. The apparatus of claim 1, wherein the apparatus further comprises an ambient light shield configured to prevent the passage of light to the corresponding photodetector other than visible light produced by the scintillator.

11. The apparatus of claim 1, wherein the scintillator is mounted on a support configured to be rotatable around the inner periphery of a computed tomography scanner;
the support configured to allow for an X-ray source to be mounted opposite the scintillator on the support.

12. The apparatus of claim 11, wherein the apparatus further comprises the X-ray source mounted opposite the scintillator on the support, the X-ray source and the scintillator configured to be rotatable together, the X-ray source configured to produce X-rays for conversion to visible light by the scintillator.

13. A method comprising:
receiving, using a scintillator configured to be rotatable around the an inner periphery of a computed tomography scanner, X-rays incident on the scintillator;
converting, using the scintillator, the received X-rays to visible light for transmission;
transmitting, using the scintillator, the visible light for detection;
detecting the transmitted visible light at a corresponding photodetector of an array of photodetectors fixed around the inner periphery of the computed tomography scanner between the scintillator and the inner periphery, each of the photodetectors in the array of photodetectors configured to output an electrical signal in response to detecting the visible light received from the scintillator.

14. The method of claim 13, wherein at least one anti-reflection layer is located between the scintillator and the corresponding photodetector, the at least one anti- reflection layer configured to facilitate the passage of visible light from the scintillator to the corresponding photodetector.

15. The method of claim 13, wherein an air gap is located between the scintillator and the corresponding photodetector, the air gap configured to allow for reducing the likelihood of damage to one or more of the scintillator and array of photodetectors caused by thermal expansion of one or more of the scintillator and the array of photodetectors.

16. The method of claim 13, wherein the scintillator comprises an X-ray incident surface configured to receive incident X-rays.

17. The method of claim 13, wherein an ambient light shield is configured to prevent the passage of light to the corresponding photodetector other than visible light produced by the scintillator.

18. The method of claim 13, wherein the scintillator is mounted on a support configured to be rotatable around the inner periphery of a computed tomography scanner;

the support configured to allow for an X-ray source to be mounted opposite the scintillator on the support.

19. A non-transitory computer readable medium comprising computer program code stored thereon, the non-transitory computer readable medium and computer program code being configured to, when run on at least one processor, control the operation of an apparatus, the apparatus comprising:
- a scintillator and an array of photodetectors;
- the scintillator configured to be rotatable around an inner periphery of a computed tomography scanner, the scintillator configured to receive X-rays incident on the scintillator, convert the received X-rays to visible light and transmit the visible light towards a corresponding photodetector of the array of photodetectors; and
- the array of photodetectors fixed around the inner periphery of the computed tomography scanner between the scintillator and the inner periphery, each of the photodetectors in the array of photodetectors configured to output an electrical signal in response to detecting the visible light received from the scintillator;
- the control providing for one or more of:
  - reception by the scintillator of X-rays incident on the scintillator;
  - conversion, by the scintillator, of the received X-rays to visible light for transmission;
  - transmission, by the scintillator, of the visible light for detection; and
  - detection of the transmitted visible light at a corresponding photodetector.

20. The non-transitory computer readable medium of claim 19, wherein an Air gap is located between the scintillator and the corresponding photodetector, the air gap configured to allow for reducing the likelihood of damage to one or more of the scintillator and array of photodetectors caused by thermal expansion of one or more of the scintillator and the array of photodetectors.

* * * * *